United States Patent [19]

Bouthors

[11] 4,109,235
[45] Aug. 22, 1978

[54] ELECTRONIC-DISPLAY INSTRUMENT PANELS FOR AUTOMOTIVE VEHICLES

[75] Inventor: Pierre Marcel Bouthors, Billancourt, France

[73] Assignees: Regie Nationale des Usines Renault; Automobile Peugeot, both of France

[21] Appl. No.: 683,222

[22] Filed: May 4, 1976

Related U.S. Application Data

[63] Continuation of Ser. No. 504,239, Sep. 9, 1974, abandoned, which is a continuation of Ser. No. 294,997, Oct. 4, 1972, abandoned.

[30] Foreign Application Priority Data

Oct. 29, 1971 [FR] France .................. 71.39061

[51] Int. Cl.$^2$ ............................................. G08B 19/00
[52] U.S. Cl. ................................ 340/52 F; 307/10 R; 315/132; 340/518; 362/23
[58] Field of Search ............ 340/27, 52 R, 52 F, 340/66, 103, 412, 413, 414, 415; 235/150.2; 307/10 R, 116; 315/77, 132, 133, 136; 317/134, 139; 240/7.1, 8.14, 8.16

[56] References Cited

U.S. PATENT DOCUMENTS 3,866,166  2/1975  Kersher et al. .................. 340/52 F

*Primary Examiner*—John W. Caldwell, Sr.
*Assistant Examiner*—Joseph E. Nowicki
*Attorney, Agent, or Firm*—Stevens, Davis, Miller & Mosher

[57] ABSTRACT

This instrument panel comprises at least two small rules or display panels of which one comprises a luminous member for displaying the values supplied from a pulse counter and the other comprises pilot-lamps carrying illuminated symbols corresponding to the magnitudes displayed for the various functions or physical conditions being measured, the device further comprising an electronic assembly consisting of a member adapted to emit periodic signals, of members for converting the signals transmitted from pickups or probes into modulated-frequency pulses, of switching members, of further display apparatus, of apparatus for adjusting the luminous intensity and of apparatus for actuating alarm devices.

17 Claims, 3 Drawing Figures

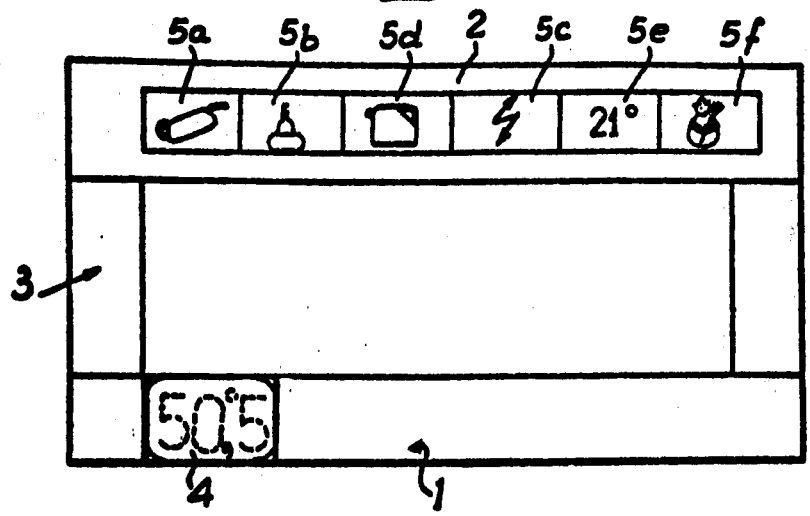
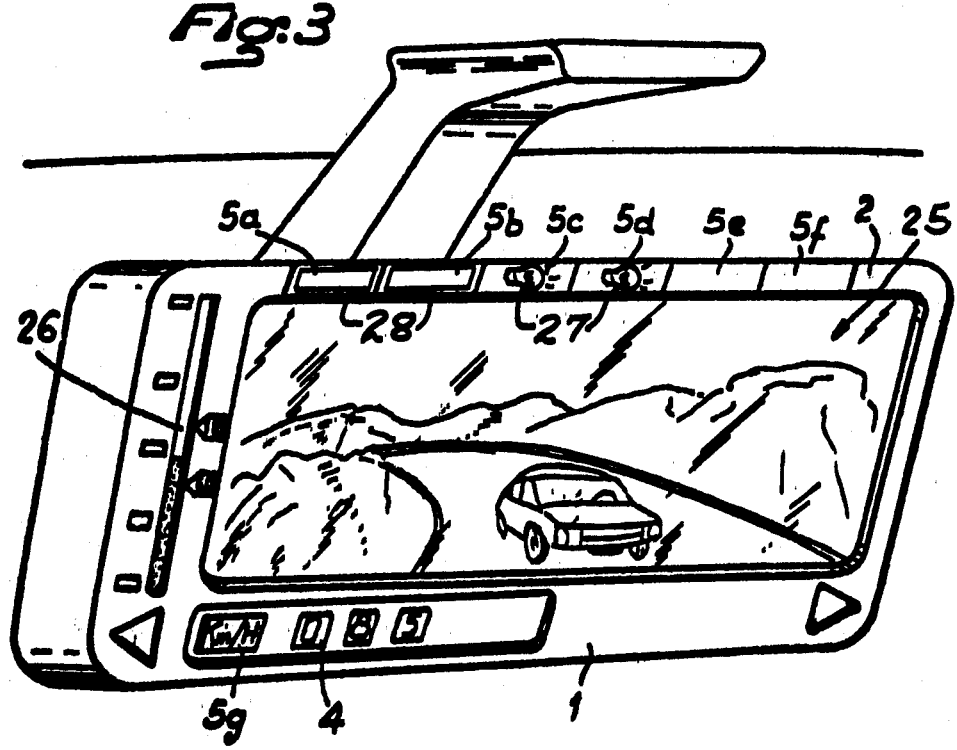

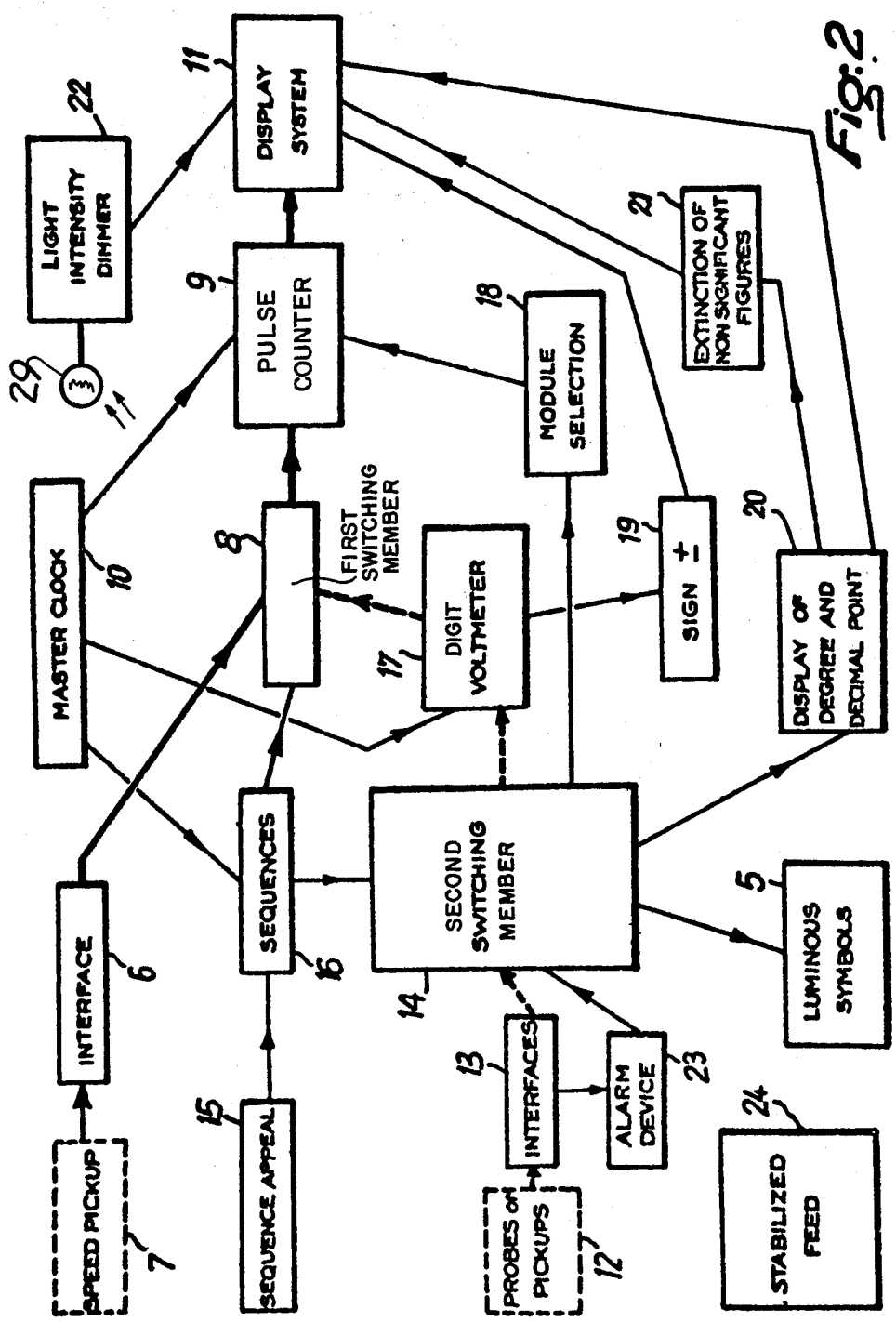

ELECTRONIC-DISPLAY INSTRUMENT PANELS FOR AUTOMOTIVE VEHICLES

This is a continuation of application Ser. No. 504,239 filed Sept. 9, 1974, now abandoned, which in turn is a continuation of application Ser. No. 294,997 filed Oct. 4, 1972, now abandoned.

The present invention relates in general to instrument panels, notably for automotive vehicles, and has specific reference to an improved electronic panel for displaying the values measured by the apparatus usually associated with instrument panels.

Conventional instrument panels of motor vehicles incorporate various measuring and control apparatus for measuring or displaying different magnitudes necessary to enable the driver to properly control his vehicle. The main instruments are the speedometer, the oil pressure gauge, the thermometers indicating the temperature of the engine cooling fluid, the inner and outer temperatures, the battery voltmeter, the ammeter, the fuel guage indicating the amount of petrol in the tank, etc.

A major inconvenience of these conventional instrument panels is on the one hand their generally poor position with respect to the field of vision of the driver who is compelled to divert his vigilant and continuous watching of the road ahead of the vehicle for reading the data displayed by the various dials, and on the other hand the fact that most instruments are sensitive to shocks and vibration generated during the vehicle operation, so that misreadings may occur.

Optical devices have already been proposed for transposing or transfering the image of the display dial or dials into a substantially vertical plane lying in the direct field of vision of the driver. However, these devices are not only hardly applicable to all the instruments but also are used almost exclusively for reading the speedometer dial, without eliminating the serious inconvenience of shocks and vibration.

Other devices intended for improving the visibility of the data corresponding to the measured values are also known; they comprise as a rule luminous units disposed on a row and responsive to the action of an electric field associated with the measuring instrument and varying as a function of the measured magnitudes.

Thus, a kind of luminous scale travelling according to the intensity of the electric field and giving fugitive measurement images is obtained.

According to a known device described and illustrated in the French Pat. No. 707.43158 of Dec. 1, 1970 filed by the same Applicants, a plurality of luminous members disposed on one or two rows constitute scales giving fugitive measurements of various magnitudes to be measured, the successive luminous members being energized by static switches responsive to voltage thresholds determined by pickups or detectors associated with the specific functions to be checked or controlled.

These last two types of known devices give measured data only on luminous scales, thus excluding any direct digit display; moreover, the indications relating to different functions appear separately for each function on a different scale disposed at a different location, so that the driver must perform a switching operation for each indication other than the speedometer indication.

It is the primary object of the present invention to provide an instrument panel eliminating all the above-listed inconveniences and comprising at the desired location within the field of vision of the driver an instrument panel of reduced dimensions on which a single luminous digit display member is adapted to translate through a suitable decoding system all the magnitudes to be measured on board a motor vehicle, and wherein the values corresponding to the measurement of a function, for example the speed of the vehicle, appear permanently, whereas selected sequences of momentary values concerning the measurement of other functions and/or physical conditions appear only on the driver's request, said digit display being associated with alarm means and adapted if desired to be combined with luminous scales.

This instrument panel displaying the values of measurements or signals emitted from pickups or probes for indicating specific functions or physical conditions, is characterized essentially in that it comprises at least two "rules" or display panels advantageously incorporated in a single dial of which the first rule comprises a member for the luminous display of values transmitted from a pulse counter and the second one contains pilot lights bearing conventional illuminated signs or symbols for the displayed magnitudes of the various measured functions or conditions, this device further comprising a member adapted to emit periodic signals during which the pulses received from the pickup are counted; members for converting the signals emitted by said pickups and probes into modulated-frequency pulses transmitted to the counter, switching means for transmitting either automatically and permanently the information from a single function or, on request of the driver of the vehicle, selected sequences of data concerning several functions or conditions, means for displaying the signs and symbols, means for regulating the luminous intensity of the display, and means for energizing light and-/or sound alarm devices at predetermined thresholds of the values displayed for the various functions.

Other features and advantages of this invention will appear as the following description proceeds with reference to the attached drawings illustrating diagrammatically by way of example a typical form of embodiment of an instrument panel.

In the drawings:

FIG. 1 is a front view of a frame comprising display rules;

FIG. 2 is a block diagram of the complete instrument panel, and

FIG. 3 is a typical form of embodiment showing the combination of an instrument panel according to this invention with a rear view mirror.

Referring first to FIG. 1, the instrument panel illustrated comprises a pair of display panels or rules 1 and 2 assembled through a frame 3. The lower rule 1 comprises a recessed window in which a luminous digit display is caused to appear, for example by means of an alpha-numeric system comprising electroluminescent diodes, or any other suitable and similar system, such as for instance cold-cathode display or indicating tubes, or liquid crystals (organic solution) having a variable reflecting power when illuminated.

The upper rule 2 comprises means for displaying the luminous images of symbols corresponding to the various functions and physical conditions to be measured. Thus, for example, 5a designates the signal lamp carrying the oil pressure symbol, 5b is a thermometric symbol for the temperature of the engine cooling fluid, 5c shows a flash symbol corresponding to the battery voltage, 5d shows a jerrican symbol designating the fuel level in the tank, 5e is the symbol corresponding to the temperature inside the vehicle, and 5f is a snow-man symbolizing the external temperature.

The numeric display at 4 constantly indicates the vehicle speed in m.p.h. (or km.p.h.) in the form of a figure (in the case of speeds below 10) or two or three figures for higher speeds. This display is obtained either through a luminescent-diode alpha-numeric system, or through any other similar system such as cold-cathode tubes, illuminated liquid crystals (organic solution) of which the reflection power varies as a function of the illumination, as suggested hereinabove.

The same display system is used for displaying, on request of the driver and by discontinuing the speed indication, one or a plurality of data sequences corresponding to measurements made of the various functions mentioned hereinabove; this display may be obtained for example by the driver, by simply actuating a switch, as will be explained presently.

At the same time with the display at 4 of the values of the various measured magnitudes, possibly with a decimal comma and/or a conventional sign (such as "°" for the degrees centigrade), the pilot lamp 27 of the corresponding symbol (5a . . . 5f) of rule 2 is illuminated. These images, possibly completed by the corresponding units of measure, may be displayed by means of a special alpha-numeric system, and a monochrome or multicolored mask 28 bearing the aforesaid symbols may cover said rule, so that only the symbol corresponding to the desired sequence appears simultaneously with the corresponding display of the measured value on rule 1. At the end of the sequences, the speedometer indication appears again in the recessed window 4.

In case of alarm, i.e. when the predetermined function threshold value has been overstepped in one or the other direction, (for example the fuel level in the tank or the temperature of the engine cooling water), the value of the function concerned and its symbol are displayed by priority and the corresponding pilot lamp of rule 2 begins to flicker. A sound signal may also be energized at the same time for attracting more the driver's attention.

Referring now to FIG. 2, showing the block diagram of the instrument panel of this invention, it will be seen that the panel equipment comprises a first interface 6 receiving the electric signals from a speed pickup unit 7 of any known type, and modulates same; the signals, at a frequency proportional to the vehicle speed, are fed permanently to a static first switching member 8 and applied thereby to a pulse counter 9 of the integrated-circuit type. A master-clock 10 connected to said counter emits square waves of constant duration; the pulses received by the counter are counted during these square waves, the number of pulses corresponding of course to the vehicle speed.

The counter 9 is provided with an alpha-numeric display system 11 of the electro-luminescent diode type, or of the cold-cathode tube type, as already mentioned hereinabove.

On the other hand, the probes or pickups designated in general by the reference numeral 12 convert into variable voltages the measures of the physical condition or the various functions to be checked. These voltages are transmitted through interfaces 13 to a multiple second switching member 14. When the driver of the vehicle actuates the sequence call device 15, for example a simple push-button, the latter actuates or energizes a so-called "sequence" device 16 connected to the master-clock 10 and to said switching system 14, and, by means of the signal received from the master-clock, starts successively the switching of the various measure sequences at adjustable time intervals. Thus, the driver can call at any time either a sequence of all the data, or for example two sequences of three data each. The voltage signals of the successive sequences are fed to a digit voltmeter 17 comprising an oscillator and receiving on the other hand the signals from the master-clock. This voltmeter converts the voltages fed thereto into pulses of which the frequency is proportional to the voltage fed to the voltmeter. The pulses from this voltmeter 17 are then fed to the first switching system 8 which is actuated and thus discontinues the transmission of signals from the speed pickup unit 7 and the corresponding display, and transmits the successive pulses to the counter 9 which displays them in succession at predetermined time intervals. At the same time, the switching member 14 illuminates in succession the symbol pilot lamps 5a to 5f of rule 2 by closing the circuits energizing these lamps.

A module selection device 18 interposed between the switching member 14 and the counter 9 causes the counter counting module to vary as a function of different measurements. Thus, the counter may count from 5 to 5 when it displays speeds, or units (or tenths) when the pulse frequency varies from 100 to 6,250 Hz (measurement of temperatures or pressures). A device 19 disposed between the voltmeter 17 and the display device 11 causes the sign + or − of voltmeter 17 to be displayed (for example in the case of positive or negative temperatures). Another device 20 connecting the switch 14 to the display unit 11 is provided for displaying the decimal point or the degree (°) sign when the displayed value corresponds to temperature; finally, a last device 21 connected to the preceding one 20 and to the display means 11 controls the extinction of the useless zero on the left-hand of the last significant figure, or the maintaining of the zero preceding the decimal point.

A dimmer or device 22 for adjusting the luminous intensity is associated with the display means 11. It may consist of a system comprising a photo-resistor 29 adapted to adjust automatically the luminous intensity as a function of the surrounding luminosity. This system is provided with time-lag or delay means so that in case of sudden change in the surrounding luminosity this variation cannot react immediately on the system, thus eliminating stray effects.

By night or in case of low surrounding luminosity, the system is set in a manner to permit the easy reading of the displayed data at any time.

An alarm system 23 connected on the one hand to the interfaces 13 of the various probes or pickups 12 and on the other hand to the switching member 14 is provided for permanently comparing voltages at the output of the interfaces corresponding to the pickups with reference voltages. Beyond predetermined thresholds, the visual alarm and possibly the sound alarm is energized as already explained in the foregoing.

Various members and devices of the block diagram of FIG. 2 are transistorized electronic devices already known per se but separately; a stabilized supply device 24 delivers the various stabilized voltages necessary for operating the assembly. These various devices and members are assembled into a compact electronic casing and interconnected by using the integrated circuit method. This casing is mounted in close vicinity of the instrument panel of FIG. 1 and connected thereto through a simple electric cable of any suitable length.

The luminous display panel according to this invention may advantageously be combined with a rear view mirror disposed in front of the windscreen, in the field of vision of the driver. The rules 1 and 2 surround in this case the mirror proper 25, as shown in FIG. 3, and the electronic casing mentioned in the preceding paragraph may be incorporated therein. The panel may be further completed by incorporating a pilot lamp 5g displaying the symbol "M.p.H." (or "Km.p.H.") illuminated when the vehicle speed is displayed. Alternatively, a luminous scale 26 may be inserted for example along one vertical side of the frame for displaying permanently in a known fashion the vehicle speed in the form of a sequence of light spots the number of which is proportional to the magnitude to be displayed. These spots may consist of electroluminescent diodes or incandescent lamps. The scale 26 may be provided, if desired, with masks of different colors, or electro-luminescent diodes emitting lights of different colors for signalling a danger or a speed-limit. Thus, for example, green spots may be used for displaying the vehicle speed up to 30 or 50 m.p.h. (according to the local official town traffic regulation), yellow spots between this limit and an upper one, for example 70 or 80 m.p.h. and then red spots beyond this last limit.

The addition of luminous scales may also be contemplated for signalling the various sequences illustrated by the luminous symbols 5a to 5f.

In this combination form of embodiment the flat screen of a television receiver may be substituted for the conventional rear view mirror, the numeric data and other measurement signs being displayed by the superimposition of characters or signs to the image of the road behind the vehicle. This permits the positioning of the display panel associated with this television receiver screen at a proper location in front of the windscreen, so that it is better adapted to the field of vision of the driver. Thus, the latter can see at any time what is going on behind his vehicle and at the same time observe on the display panel all the measurements appearing thereon.

Other combinations may be contemplated by those conversant with the art without departing from the basic principles of the invention as set forth in the appended claims.

What is claimed as new is:

1. An electronic-display instrument panel for motor vehicles, adapted to display values of data signals emitted from sensing devices detecting various parameters of functions and physical conditions, comprising a frame and at least first and second small display panels incorporated in the frame, a signal pulse counter, the first display panel comprising a luminous digit display means connected to said counter for displaying values of counted pulses, the second display panel comprising conventional symbol designs and means for illuminating said designs, said symbol designs being associated with the displayed values, said instrument panel further comprising a clock member connected to said counter for emitting constant periodic signals during which pulses received by said counter are counted, a plurality of means connected to said sensing devices for converting voltages of data signals emitted by said sensing devices into other signals to be transmitted to said counter, said converting means including a first means for converting the voltage of the signals of a first sensing device emitting frequency pulses, and a plurality of second means for converting the voltage of signals of the other sensing devices concerning a plurality of parameters, a first switching member, connected to said first means for converting, for transmitting to said counter data concerning a single function parameter and on request data concerning sequences of different parameters, a multiple second switching member having a plurality of switches which are connected to said plurality of second means for converting and said second display panel, a third means connected to said first and second switching members and to said clock member for converting into frequency pulses the voltage of signals transmitted by said second means for converting, means for selecting data sequences concerning a plurality of parameters of functions and physical conditions and connected to said clock member and to said first and second switching members, means connected to said sequences selecting means for starting on request under the control of the vehicle driver switching of different data sequences, means connected to said luminous display means for adjusting the luminous intensity of the display on said first display panel, and means connected to said second means for converting the voltage of signals of sensing devices and to said second multiple switching member for energizing by priority alarm devices when predetermined thresholds of the values displayed for various parameters are overstepped.

2. An instrument panel according to claim 1 wherein said means for illuminating said designs on said second display panel includes pilot lamps.

3. An instrument panel according to claim 1 wherein said symbol designs of said second display panel corresponding to the parameters of functions and physical conditions detected by said sensing devices, comprises an alpha-numeric system illuminating said designs.

4. An instrument panel according to claim 1 wherein said luminous display means comprises an alpha-numeric system adapted to display the result of the counting operation of said counter.

5. An instrument panel according to claim 1 wherein colored transparent masks cover said symbol designs.

6. An instrument panel according to claim 1 wherein said means for selecting selects automatically the order and number of the data sequences.

7. An instrument panel according to claim 1 wherein said pulse counter is associated with an integrated circuit connected to said first switching member for receiving emitted signal pulses and to said second switching member through a module selecting device for varying the counter as a function of said various parameters.

8. An instrument panel according to claim 1 wherein said means for adjusting the luminous intensity of said luminous display means of said first display panel is a dimmer connected with said luminous display means and comprising a photo-resistor controlling the voltage of current energizing said luminous display means for adjusting automatically and with a certain time-lag said luminous intensity as a function of the luminosity surrounding the panel.

9. An instrument panel according to claim 1 wherein said first and second means for converting the signals emitted by said sensing devices comprise for each sensing device an interface for converting the signal voltage, and said third means for converting signals comprises a digit voltmeter converting into frequency pulses the voltage of signals received from the interfaces connected to the sensing devices, said digit voltmeter being controlled by said second multiple switching member and synchronized by said clock member.

10. An instrument panel according to claim 9 wherein said alarm devices are associated with said interfaces for sensing devices detecting the various functions and also with said second multiple switching member and compare between the voltages transmitted by said interfaces and reference voltages so as to give a priority, with regard to any involved display data, to a predetermined threshold in connection with this comparison, while causing flickering of corresponding pilot lamps illuminating a corresponding symbol design on said second display panel.

11. An instrument panel according to claim 9 wherein said luminous display means comprises a means for displaying the sign + or − from said digit voltmeter, another means associated with said second switching member for displaying a degree sign and a decimal point, and a device for extinguishing non-significant figures associated with said means for displaying a degree sign and a decimal point.

12. An instrument panel according to claim 1 wherein a rear view mirror mounted in front of the vehicle windscreen is associated with the instrument panel, said first and second display panels surrounding said mirror.

13. An instrument panel according to claim 12 wherein said mirror comprises the screen of a television receiver.

14. An instrument panel according to claim 12 further comprising a graduated luminous scale for displaying at least one parameter value.

15. An instrument panel according to claim 14 wherein said display scale is made in different colors.

16. An instrument panel according to claim 14 wherein colored fixed frames cover said scale.

17. An instrument panel according to claim 14 wherein colored movable frames cover said scale.

* * * * *